United States Patent
Hözel (10) Patent No.: US 10,106,020 B2
(45) Date of Patent: Oct. 23, 2018

(54) ARRANGEMENT HAVING A COVER FOR A VEHICLE ROOF

(71) Applicant: Webasto SE, Stockdorf (DE)

(72) Inventor: Dominik Hözel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/309,783

(22) PCT Filed: May 11, 2015

(86) PCT No.: PCT/EP2015/060337
§ 371 (c)(1),
(2) Date: Nov. 8, 2016

(87) PCT Pub. No.: WO2015/173177
PCT Pub. Date: Nov. 19, 2015

(65) Prior Publication Data
US 2017/0151862 A1   Jun. 1, 2017

(30) Foreign Application Priority Data

May 14, 2014  (DE) .................. 10 2014 106 808
Jul. 28, 2014  (DE) .................. 10 2014 110 626

(51) Int. Cl.
*B60J 7/057*  (2006.01)
*B60J 7/043*  (2006.01)

(52) U.S. Cl.
CPC ............. *B60J 7/0435* (2013.01); *B60J 7/057* (2013.01)

(58) Field of Classification Search
CPC ... B60J 7/0435; B60J 7/05; B60J 7/047; B60J 7/057

(Continued)

(56) References Cited

U.S. PATENT DOCUMENTS 8,905,467 B2  12/2014  Kokubo et al.
2003/0011215 A1  1/2003  Arnold et al.
(Continued)

FOREIGN PATENT DOCUMENTS

DE   10 2006 010755 A1   9/2007
DE       102011015833 A1   10/2012
(Continued)

OTHER PUBLICATIONS

International Search Report for PCT/EP2015/060337 dated Sep. 10, 2015; English translation submitted herewith (5 pages).

*Primary Examiner* — Dennis H Pedder
(74) *Attorney, Agent, or Firm* — Fitch, Even, Tabin & Flannery, LLP (57) ABSTRACT

An arrangement having a cover for a vehicle roof which, starting from a closed position for closing a roof opening, is raisable for opening using deployment means in the rear region and is displaceable toward the rear over the vehicle roof to an open position. The deployment means have a sliding member displaceable in the longitudinal direction of the vehicle in a guide rail by means of a drive. The deployment means have a deployment rod, having a coupling element, the deployment rod displaceable in the longitudinal direction of the vehicle by means of the sliding member, which deployment rod in the closed position of the cover coupled to the sliding member. The deployment means have a pocket in relation to the guide rail configured to be stationary and in terms of the shaping is adapted to the coupling element of the deployment rod.

8 Claims, 8 Drawing Sheets

(58) Field of Classification Search
USPC .......... 296/216.02–216.05, 220.01, 221–223
See application file for complete search history.

(56) References Cited

U.S. PATENT DOCUMENTS

2009/0072589 A1   3/2009   Ito et al.
2009/0079234 A1   3/2009   Faerber

FOREIGN PATENT DOCUMENTS

| EP | 0 555 977 A1 | 8/1993 |
| EP | 1 275 541 A1 | 1/2003 |
| EP | 2 650 156 A1 | 10/2013 |
| JP | 2013256278 A | 12/2013 |

ARRANGEMENT HAVING A COVER FOR A VEHICLE ROOF

CROSS-REFERENCE TO RELATED APPLICATIONS

This application is a U.S. national phase application filed under 35 U.S.C. § 371 of International Application No. PCT/EP2015/060337, filed May 11, 2015, designating the United States, which claims priority from German Patent Application Nos. 102014106808.4 and 102014110626.1 filed May 14, 2014 and Jul. 28, 2014, respectively, which are hereby incorporated herein by reference in their entirety for all purposes.

FIELD

The invention relates to an arrangement having a cover for a vehicle roof which, starting from a closed position for closing a roof opening, is raisable for opening using deployment means in the rear region thereof and which is displaceable toward the rear over the vehicle roof to an open position.

BACKGROUND

Such arrangements having a cover for a vehicle roof are known in many forms from the prior art. Typically, during an opening operation of a roof opening, a sliding drive member in the longitudinal direction of the vehicle is displaced toward the rear. In lateral regions of the cover, deployment means are provided in order to raise the cover before it is displaced further toward the rear to an open position, in order for the roof opening to be released to a maximum extent.

In order for the cover to be raised or deployed, using the sliding drive member a deployment rod which is coupled to the cover by means of a rear deployment lever in the rear region is displaced toward the rear in the longitudinal direction of the vehicle. Subsequently, when the cover has been deployed or raised to the maximum extent, in the event of a further displacement of the sliding member, the deployment rod is locked in the guide rail so that the deployment rod and also the rear deployment lever are locked in the respective positions thereof.

An object on which the invention is based is to describe an arrangement having a cover for a vehicle roof that enables secure locking of the deployment rod.

SUMMARY

According to the invention, an arrangement having a cover for a vehicle roof is described which, starting from a closed position for closing a roof opening, is raisable for opening using deployment means in the rear region thereof and which is displaceable toward the rear over the vehicle roof to an open position. The deployment means have a sliding member which is displaceable in the longitudinal direction of the vehicle in a guide rail by means of a drive. Furthermore, the deployment means have a deployment rod, having a coupling element, the deployment rod being displaceable in the longitudinal direction of the vehicle by means of the sliding member, wherein the deployment rod in the closed position of the cover is coupled to the sliding member. The deployment means further have a pocket which in relation to the guide rail is configured so as to be stationary fixed and which in terms of the shaping thereof is adapted to the coupling element of the deployment rod. Moreover, the deployment means have a further coupling element and a locking slotted link, of which the deployment rod has the one, and the sliding member has the respective other. Starting from the closed position of the cover, upon displacing the sliding member in the longitudinal direction of the vehicle toward the rear, the deployment rod is decouplable from the sliding member in a decoupling plane. Upon further displacement of the sliding member, the deployment rod in relation to the guide rail can be locked in a form-fitting manner. For locking, the further coupling element and the locking slotted link are mutually engaged in such a manner that introducing the coupling element of the deployment rod into the pocket is controllable substantially in the normal direction of the decoupling plane.

Displacing the cover over the vehicle roof means the cover, following being raised or deployed, in the region of a rear edge of the cover is pushed over an external side of the vehicle roof. The arrangement is preferably an arrangement for a spoiler roof. The location indications or directional indications used, such as "rear" or "front", refer to the longitudinal direction of the vehicle. The longitudinal direction of the vehicle may also be referred to as the horizontal direction or X direction of the mathematical coordinate system. The deployment or raising of the cover is carried out substantially in a vertical direction or Z direction of the mathematical coordinate system. The rear region of the cover is intended, for example, to be understood to be the region which, starting from a center of the cover, faces a rear of the vehicle.

"Substantially in the normal direction" also comprises directions with a slight angular deviation from the normal direction of the decoupling plane.

The arrangement provides that the deployment rod, starting from the closed position of the cover, by means of the sliding member is displaceable in the longitudinal direction of the vehicle toward the rear, in order to deploy a rear deployment lever. Upon further displacement of the sliding member, the deployment rod is decoupled from the sliding member in the decoupling plane. In other words, a coupling in order for the deployment rod to be entrained is released in a rearward manner in the longitudinal direction of the vehicle by means of the sliding member.

The decoupling plane is to be understood as that plane in which the coupling between the sliding member and the deployment rod is released. For example, the deployment rod is coupled to the sliding member by way of an engagement element such as the coupling element, a cam, a bolt, another sliding element, or the like, such that the sliding member upon displacement in the longitudinal direction of the vehicle toward the rear entrains the deployment rod. This means that the deployment rod is locked to the sliding member in the X direction. Following deployment of the rear deployment lever by means of the deployment rod, the deployment rod decouples from the sliding member, wherein the engagement element is released from the sliding member. Herein, the deployment rod is no longer locked to the sliding member in the X direction. Releasing herein is performed in the decoupling plane which is defined by the X direction and a direction that is perpendicular to the X direction, for example the Z direction. For example, the engagement element is guided in a slotted link of the sliding member and exits said slotted link in the decoupling plane in order to be decoupled.

Furthermore, the deployment means are configured in such a manner that the deployment rod after decoupling is locked in a stationary fixed manner in relation to the guide rail. To this end, the sliding member has a locking slotted link, and the deployment rod has a further coupling element. Alternatively, the deployment rod has the locking slotted link, and the sliding member has the further coupling element. By way of interaction between the locking slotted link and the further coupling element, locking is controlled in such a manner that the coupling element of the deployment rod is introduced into the pocket in a form-fitting manner in the normal direction to the decoupling plane. For example, the normal direction is the Y direction of the mathematical coordinate system that runs normal to the X-Z plane. By way of the form-fitting introduction it is achieved that the deployment rod is locked in all directions that run parallel with the decoupling plane. Thus, the deployment rod and, on account thereof, also the rear deployment lever, are blocked in the respective positions thereof.

By way of the type of locking described, the mechanism of the arrangement may also be used as a BL (bottom load) mechanism. Herein, the cover is installable in the roof opening from below. Furthermore, switching noises are minimized since locking is controlled by means of a slotted link, specifically the locking slotted link.

Furthermore, the arrangement thus enables a locking mechanism which has only very few components or component parts, respectively. In particular, no delicate components and/or spring elements are required. Moreover, there are no clearances that would have to be incorporated in the guide rail, for example, on account of which material costs and production costs may be saved. Furthermore, assembly of the arrangement is simplified and less time-consuming. A further advantage lies in the force transmission of the locking mechanism in which abrupt load steps are reduced or avoided. Finally, a further advantage lies in that wear on the arrangement is very minor due to the use of a locking slotted link. Furthermore, the deployment rod is not bent for locking but is merely displaced. On account thereof, wear of the deployment rod AS is kept low, wherein fatigue failure of the deployment rod AS by virtue of flexural fatigue stress is avoided or at least reduced, for example.

Furthermore, the deployment rod and the coupling element of the deployment rod are rigidly interconnected. For example, the coupling element and the deployment rod are integrally manufactured. On account thereof, only a short tolerance chain is created for locking the deployment rod. A tolerance chain is understood to be the interaction between a plurality of mechanical components, considering production-dependent shape and/or positioning tolerances. The fewer the components that interact in motion, the fewer the tolerances that have to be compensated for. Further elements such as spring elements or other would require a larger tolerance chain which has to be considered and compensated for in order to guarantee reliable locking. Moreover, disturbing noises such as rattling and switching noises are avoided on account of the minor tolerance chain.

According to one design embodiment of the invention, the deployment rod is biased in such a manner that a spring force in the normal direction of the decoupling plane acts in the direction of the pocket. The deployment rod is biased, for example bent in relation to the longitudinal axis thereof, in particular prior to assembly. On account thereof, the deployment rod has a slightly curved profile. Upon assembly of the arrangement, the deployment rod is bent counter to the original bent state thereof, so as to be substantially straight, for example, and assembled such that a spring force by virtue of the bias acts on the deployment rod. This spring force ensures that the further coupling element is urged in the direction of the pocket. If and when the coupling element is located in the pocket in a form-fitting manner, the spring force or the bias, respectively, ensures that the coupling element cannot readily jump out of the pocket. On account thereof, it is guaranteed that the deployment rod in the locked state is held in a particularly reliable manner in the pocket by means of the coupling element.

According to a further design embodiment of the invention, a profile of the locking slotted link in the longitudinal direction of the vehicle toward the rear has a front portion in which a spacing in the normal direction between the locking slotted link and the pocket remains the same, a central portion in which the spacing in the normal direction between the locking slotted link and the pocket is varied, and a rear portion in which the spacing in the normal direction between the locking slotted link and the pocket remains the same. Preferably, the spacing in the central portion is increased in the longitudinal direction of the vehicle toward the rear. A variation of the spacing herein is understood to be a substantial variation of the spacing, wherein the profile runs in a curved, ramped, and/or stepped shape, in particular. The spacing remaining the same herein is understood to mean that the spacing is varied not at all or only to a very minor degree, for example at a small angle in relation to the longitudinal direction of the vehicle.

By way of a profile of the locking slotted link of this type it is possible that upon displacement of the sliding member the deployment rod by way of the further coupling element is displaced in the normal direction to the decoupling plane in such a manner that introducing the coupling element of the deployment rod into the pocket is controlled.

According to a further design embodiment, the further coupling element in the venting position of the cover is located in the rear portion, and following introduction into the pocket is located in the front portion of the locking slotted link.

According to a further design embodiment of the invention, the deployment rod in the closed position of the cover by way of the coupling element is coupled to a slotted link which is stationary fixed in relation to the guide rail. Decoupling from the sliding member in the decoupling plane of the deployment rod is controllable by means of the stationary fixed slotted link.

The pocket is preferably configured in the normal direction in the region of this stationary fixed slotted link. On account thereof, it is possible for one and the same coupling element of the deployment rod to be used for decoupling and for locking. On account thereof, overall installation space may be saved. Furthermore, material costs and manufacturing costs could be reduced.

According to a further design embodiment of the invention, the decoupling plane is defined by the longitudinal direction of the vehicle and by a vertical direction which is perpendicular thereto. In accordance with the definitions of the directions as have been described at the outset, the normal direction in this case is parallel with a Y direction which runs perpendicularly to each of the described X and Z directions of a coordinate system. This means that the deployment rod is decoupled in the decoupling plane that is defined by the Z direction and the X direction, and is locked in the pocket in a form-fitting manner in the Y direction so as to be normal to this decoupling plane.

Further design embodiments are described in the dependent claims and in the following detailed description of an exemplary embodiment with the aid the appended figures.

Elements or features having the same construction or function are given the same reference numerals in all the figures. Elements or features which have already been described using reference numerals are not necessarily provided with reference numerals in all the figures.

DETAILED DESCRIPTION

Figure 1:
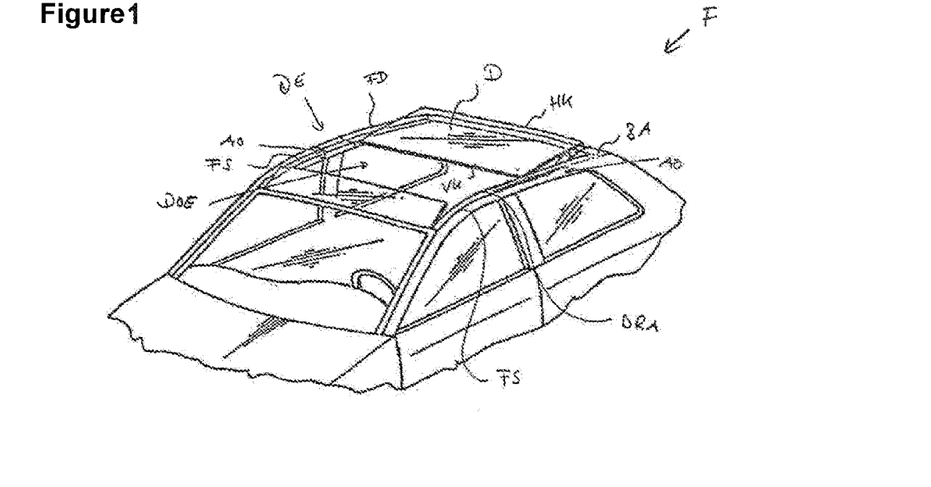
FIG. 1 shows a schematic perspective view of a vehicle.

FIG. 1 shows a schematic perspective view of a vehicle F with a vehicle roof FD. The vehicle roof FD has a securing portion BA which is fixed to the vehicle and is configured as a roof shell. The securing portion BA, fixed to the vehicle, is provided with a roof opening DOE which by means of an adjustable, movable roof element DE is selectively closed or at least partially releasable.

The roof opening DOE is delimited by a roof frame portion DRA which is configured on the vehicle roof FD. The roof frame portion DRA preferably has guide rails FS disposed on both sides.

The roof element DE has a cover D and is mounted in the region of the securing portion BA so as to be relatively displaceable in relation to the guide rails FS. Herein, the roof element DE by way of a cover carrier and arrangements AO is displaceably mounted in the guide rails FS. The cover D is preferably configured as a glass cover.

The arrangements AO which are disposed in the region of the guide rails FS serve the purpose of displacing the cover D which closes the roof opening DOE of the vehicle roof FD from a closed position to an open position, so as to release the roof opening DOE of the vehicle roof FD. To this end, the arrangements AO have the deployment means. For opening, the cover D is raised in a rear region and pushed over a rear part of the vehicle roof FD. To this end, it is necessary for the cover D to be raised since the latter in the closed position terminates so as to be flush with the upper side of the vehicle roof FD. In the case of a typical sequence of motion, a rear edge HK of the cover D is deployed first. This intermediate position is also referred to as a venting position. In the further course of the opening movement, the cover D is displaced in the longitudinal direction of the vehicle toward the rear to the open position.

This typical sequence of motion is established with the aid of the arrangements AO which will be described in more detail by means of the following FIGS. 2 to 13. Herein, only one arrangement AO on one side, together with the associated mechanism, is illustrated in each of these FIGS. 2 to 13. However, all parts are disposed in a mirror image in relation to a central longitudinal plane of the vehicle F on both sides of the roof opening DOE. The arrangement AO may also be referred to as a deployment device. It should be noted that only one cover carrier DT which is mechanically fixedly coupled to the cover D is illustrated in FIGS. 2 to 13. The cover D is thus directly coupled to the deployment means and is movable with the aid of the latter. Displacing of the cover D is therefore commensurate with displacing the cover carrier DT.

A coordinate system which indicates the directions X and Z, or X, Y, and Z, respectively, is illustrated in each of FIGS. 2 to 13. The coordinate system corresponds to the mathematical coordinate system. The X direction herein may also be referred to as the longitudinal direction of the vehicle, or as the horizontal direction. The Z direction may also be referred to as the vertical direction.

Figure 2:
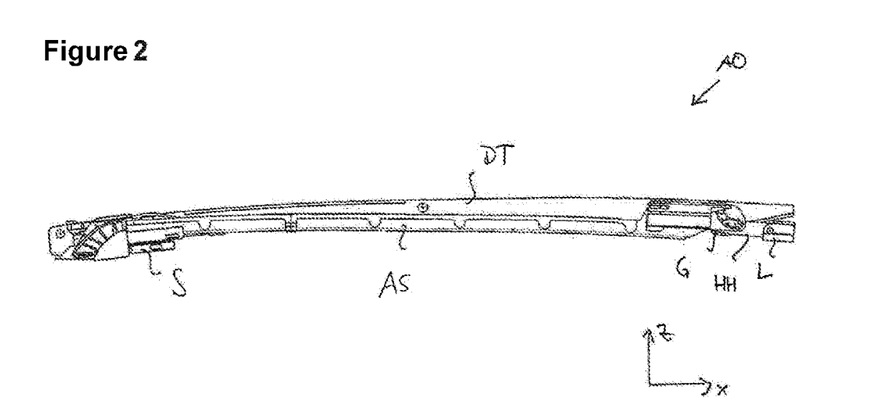
FIG. 2 shows a schematic side view of an arrangement having a cover for a vehicle roof of the vehicle.

FIG. 2 shows a schematic side view of an arrangement AO. The deployment means of the arrangement AO comprise a sliding member S which is displaceable in the longitudinal direction of the vehicle by means of a drive in a guide rail FS. The deployment means furthermore comprise a deployment rod AS, a stationary fixed bearing L, and a rear deployment lever HH. The rear deployment lever HH is pivotably connected to a slider G which is displaceably coupled to the cover carrier DT. The closed position of the cover D is illustrated in FIG. 2.

If and when, starting from the closed position of the cover D, the sliding member S is displaced, the deployment rod AS is likewise displaced toward the rear in parallel with the longitudinal direction of the vehicle, since the deployment rod AS is initially mechanically coupled to the sliding member S. Herein, the rear deployment lever HH is pivoted in relation to the bearing L such that the cover carrier DT, or the cover D, respectively, is deployed or raised, respectively, in the region of the rear edge HK. The cover D in this deployed state is located in the venting position. If and when the sliding member S is displaced farther toward the rear, the sliding member S is decoupled from the deployment rod AS. This means that the deployment rod AS is no longer locked in the X direction in the sliding member S. Simultaneously, the deployment rod AS in the region of the front end thereof is secured by a locking mechanism so as to be stationary fixed in relation to the guide rail FS. This means that the rear deployment lever HH is likewise held so as to be blocked in the deployed position. Upon further displacement of the sliding member S, the latter entrains the cover carrier DT and pushes the cover carrier DT and thus the cover D over the vehicle roof FD to the open position. This is possible as has been described in that the rear deployment lever HH by way of the slider G is displaceably coupled to the cover carrier G.

The deployment means of the arrangement AO in the front region of the cover D will be discussed in detail in the following FIGS. 3A to 5B. Decoupling of the deployment rod AS from the sliding member S will be explained in particular. In this context, decoupling means that the sliding member S no longer entrains the deployment rod AS in the X direction toward the rear. In other exemplary embodiments (not shown), the deployment means are of a different configuration so as to establish decoupling of the deployment rod AS from the sliding member S. In particular, other elements such as levers or the like may be provided. It is essential only that decoupling does take place.

Figure 3A:
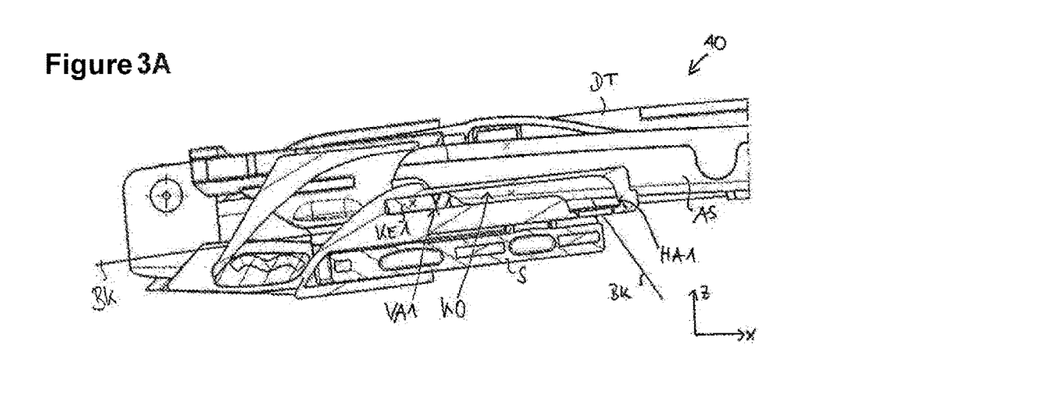
FIGS. 3A and 3B show schematic, enlarged partially sectioned side views of the arrangement in a closed position.
Figure 3B:
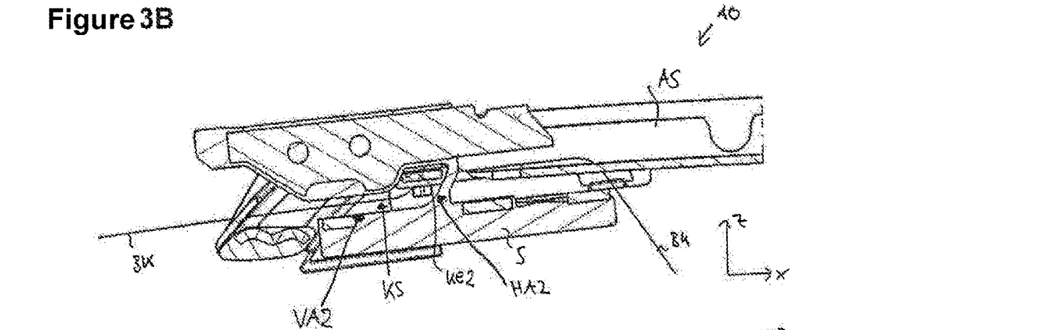
Figure 4A:
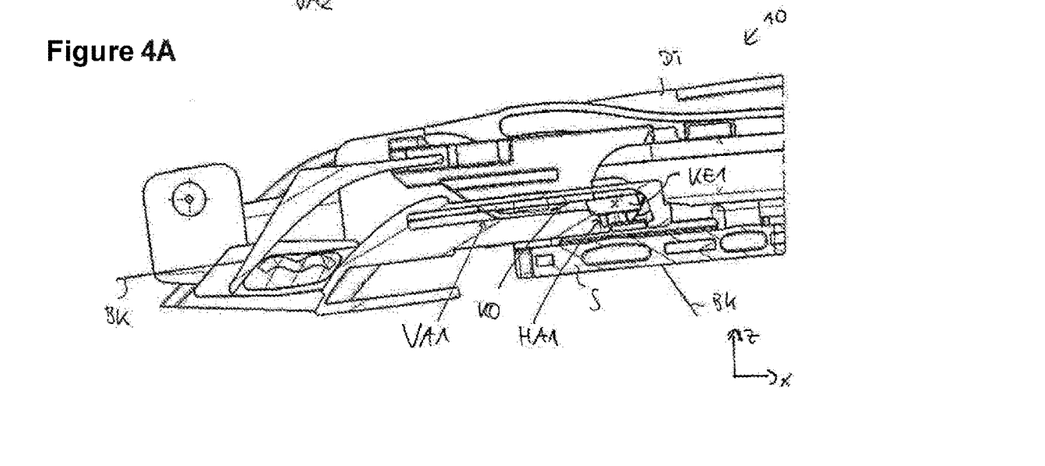
FIGS. 4A and 4B show two first schematic, enlarged partially sectioned side views of the arrangement in a venting position.
Figure 4B:
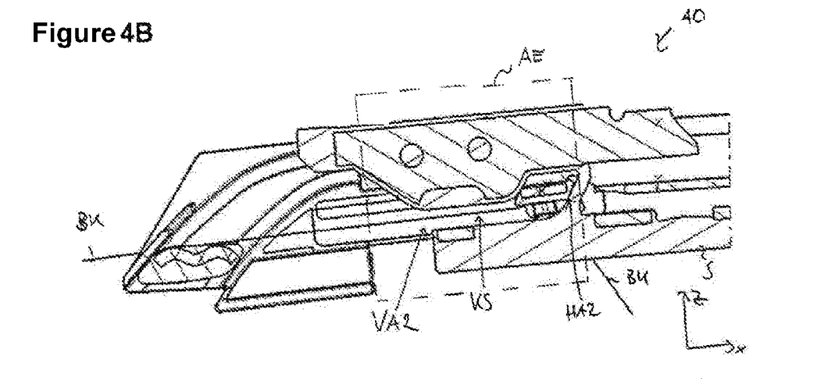
Figure 5A:
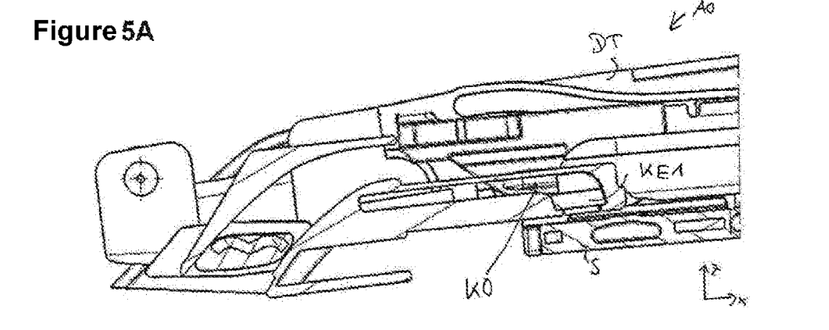
FIGS. 5A and 5B show two schematic, enlarged partially sectioned side views of the arrangement in the venting position.
Figure 5B:
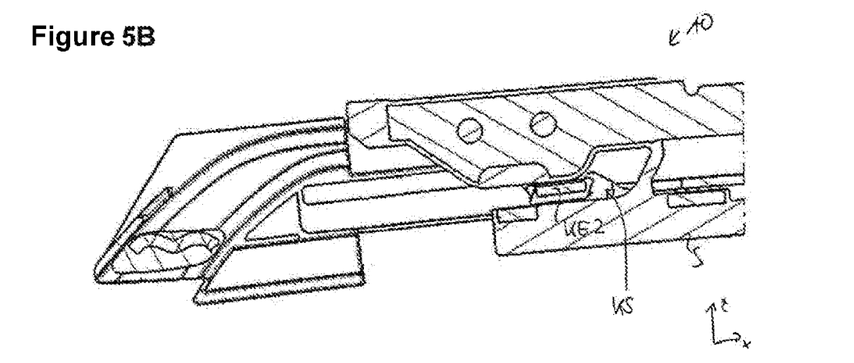

FIGS. 3A to 5B are subdivided into pairs of figures which are identified by the suffixes "A" and "B". Herein, a pair of figures, for example 3A and 3B, shows the arrangement AO in a specific state of the described sequence of motion, wherein two different side views, each partially sectional, of the arrangement AO at a same point of time are schematically illustrated. FIGS. 3A and 3B show the arrangement AO in the closed position of the cover D. FIGS. 4A and 4B show the arrangement AO in the venting position. FIGS. 5A and 5B show the arrangement AO in a further state, wherein the cover D is still in the venting position. The respective two partially sectional side views of a pair of figures herein run through two different planes which are parallel to the image plane of the figures, wherein the focus in those figures identified with the suffix "A" is placed on a stationary fixed slotted link KO of the vehicle F, and in those figures identified with the suffix "B" is placed on a sliding member slotted link KS of the sliding member S. It is a common feature of all FIGS. 3A to 5B that the latter illustrate a front end of the deployment rod AS in the region of a front edge VK of the cover D (cf. FIG. 1).

As has already been mentioned, the arrangement AO has a sliding member S. The sliding member S has a sliding member slotted link KS. The arrangement AO furthermore has a stationary fixed slotted link KO. Herein, the stationary fixed slotted link KO is stationary fixed in relation to the guide rail FS. The deployment rod AS has a first coupling element KE1 and a second coupling element KE2, which are disposed on opposite sides of the deployment rod AS. The two coupling elements KE1 and KE2 are configured as sliding elements.

The deployment rod AS in the closed position of the cover D is guided in the stationary fixed slotted link KO by means of the first coupling element KE1. The stationary fixed slotted link KO has a front portion VA1 and a rear portion HA1. The front portion VA1 has a profile in which, in the closed position of the cover D, a spacing between the stationary fixed slotted link KO and the cover D is substantially not varied. The rear portion HA1 of the stationary fixed slotted link KO has a profile in which the spacing between the cover D and the stationary fixed slotted link KO increases in the longitudinal direction of the vehicle toward the rear.

The deployment rod AS in the closed position of the cover D is guided in the sliding member slotted link KS by means of the second coupling element KE2. The sliding member slotted link KS has a profile in which, in the closed position of the cover D, the spacing between the cover and the sliding member slotted link KS in a front portion VA2 does not vary or remains the same, respectively. The sliding member slotted link KS in a rear portion HA2 of the sliding member slotted link KS has a profile in which the spacing between the cover and the sliding member slotted link KS decreases.

Herein, the spacing between the cover D and the respective slotted link KS or KO, respectively, refers to a trajectory BK of the respective slotted link KS or KO, respectively, such as indicated in FIG. 3B, for example. The trajectories BK herein are to be understood to be schematic and offer only limited insight into any actual length or design embodiment of the slotted link KS or KO, respectively.

The first coupling element KE1, in the closed position of the cover D, is located in the front portion VA1 of the stationary fixed slotted link KO (cf. FIG. 3A). The second coupling element KE2 of the deployment rod AS is located in the rear portion HA2 of the sliding member slotted link KS (cf. FIG. 3B). Thus, the deployment rod AS is locked or guided, respectively, in the Z direction by means of the stationary fixed slotted link KO and the first coupling element KE1. By contrast, movement of the deployment rod AS in relation to the stationary fixed slotted link KO in the longitudinal direction of the vehicle, or the X direction, respectively, is released. The opposite applies to the sliding member slotted link KS of the sliding member S, wherein the deployment rod AS is locked in the X direction by means of the second coupling element KE2, while a Z movement is released.

If and when the sliding member S now is displaced in the longitudinal direction of the vehicle toward the rear, said sliding member S entrains the deployment rod AS in the longitudinal direction of the vehicle toward the rear. This is due to the deployment rod being locked in the X direction by means of the second coupling element KE2 in the sliding member slotted link KS, while movement of the deployment rod AS in parallel with the longitudinal direction of the vehicle by means of the stationary fixed slotted link KO is released.

If and when the sliding member S is displaced farther toward the rear, that state of the arrangement AO that is shown in FIGS. 4A and 4B is reached. By virtue of the profiles that in the rear region, or in the rear portions HA1 and HA2, respectively, of the stationary fixed slotted link KO, or the sliding member slotted link KS, respectively, run counter to one another, a so-called transfer of the two coupling elements KE1 and KE2 is obtained, wherein the two slotted links KO and KS swap their respective locking directions. Herein, by virtue of the guidance of the stationary fixed slotted link KO in the Z direction, the first coupling element KE1 is guided into the rear portion HA2 of the stationary fixed slotted link KO, while the second coupling element KE2 is moved from the rear portion HA2 of the sliding member slotted link KS into the front portion VA2 of the sliding member slotted link KS. The cover D is thus at least partially in the venting position.

If and when the sliding member S is now displaced farther, the state shown in FIGS. 5A and 5B is obtained, wherein the first coupling element KE1 is now completely located in the rear portion HA1 of the stationary fixed slotted link KO. The deployment rod AS is thus initially locked in the X direction in the stationary fixed slotted link KO by means of the first coupling element KE1. Simultaneously, movement in the X direction is released by means of the sliding member slotted link KS. The deployment rod AS by way of the second coupling element KE2 is now guided in the Z direction in the sliding member slotted link KS. The cover D is now in the venting position.

In the case of the sequence of motion described by means of FIGS. 3A to 5B the deployment rod AS has been decoupled from the sliding member S. As is shown in an exemplary manner in FIG. 4B, this decoupling substantially takes place in a decoupling plane AE. The decoupling plane AE is defined by the X direction and the Z direction. During decoupling of the deployment rod AS the latter is not bent or curved but merely displaced in the decoupling plane AE.

Were the sliding member S, starting from the state illustrated in FIGS. 5A and 5B, to be farther displaced in the longitudinal direction of the vehicle toward the rear, the deployment rod AS would possibly depart from the sliding member slotted link KS. On account thereof, the deployment rod AS would not only be decoupled from the sliding member S but additionally also no longer be guided by the sliding member slotted link KS in the Z direction. On account thereof, it is possible in certain instances that locking of the deployment rod AS in the X direction is cancelled by raising the cover D, for example by virtue of an unauthorized external event.

In order to reliably guarantee locking in the X direction, the deployment rod AS, in addition to the locking as has been described by means of FIGS. 3A to 5B, is locked in the normal direction to the decoupling plane. This is described by means of FIGS. 6 to 13. It should be pointed out at this stage that decoupling of the deployment rod AS from the sliding member S, as is described by means of FIGS. 3A to 5B, may also be performed in another manner, for example by means of levers and/or spring elements. It is only essential for the locking described hereunder that the deployment rod AS is decoupled from the sliding member S in the decoupling plane AE.

Figure 6:
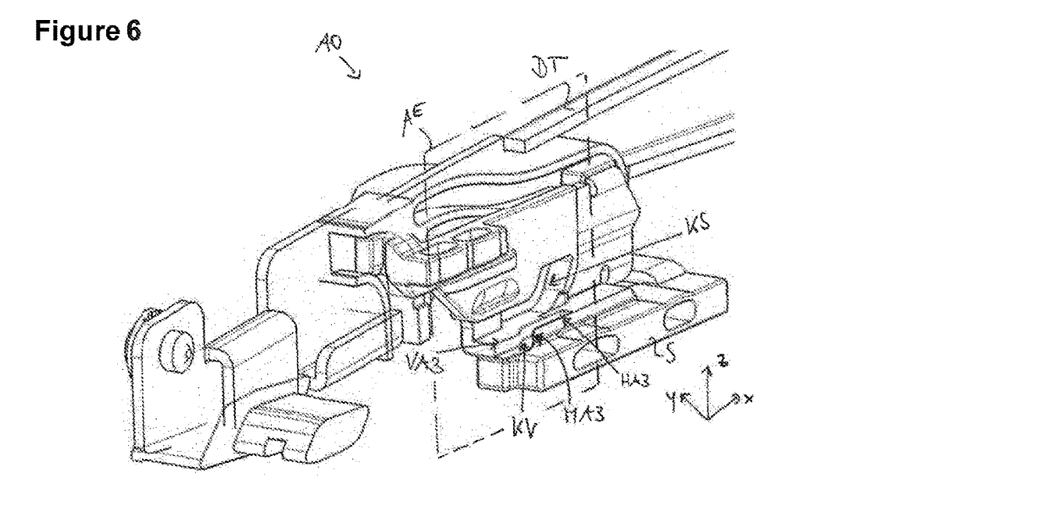
FIGS. 6 and 7 show two perspective views of the arrangement in a front region in the venting position.

FIG. 6 shows a perspective view of the arrangement AO in which for reasons of clarity the deployment rod AS has been dispensed with. A front region of the arrangement AO is shown herein. The sliding member slotted link KS of the sliding member S can furthermore be seen. The cover D is momentarily in the venting position. Additionally, the coordinate system can be completely seen, in particular including the Y direction.

Apart from the sliding member slotted link KS the sliding member S furthermore has a locking slotted link KV which is configured in a part of the sliding member S. As will be described later, the locking slotted link KV serves for additionally locking the deployment rod AS in the Y direction. The locking slotted link KV, in the closed position of the cover D, has a profile with at least three portions. Herein, the profile in the longitudinal direction of the vehicle toward the rear is divided into a front portion VA3, a central portion MA3, and a rear portion HA3. The front portion VA3 of the locking slotted link KV herein is configured in such a manner that a spacing between the locking slotted link KV and the decoupling plane AE is not varied, that is to say remains substantially the same. In other words, this means the profile in the Y direction is not varied. The portion of the locking slotted link KV is varied in the central portion MA3 of the locking slotted link KV, while said portion in turn remains the same in the rear portion HA3. The spacing in the central portion MA3 of the locking slotted link KV is varied in such a manner that said spacing in the longitudinal direction of the vehicle toward the rear, in the normal direction to the decoupling plane AE, increases in the positive Y direction.

Figure 7:
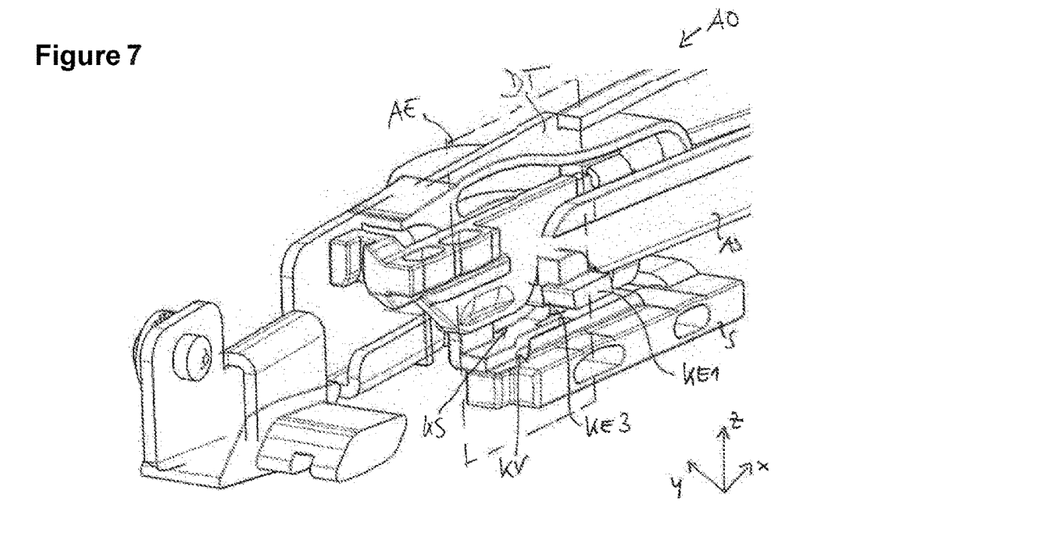

The deployment rod AS is illustrated in FIG. 7 in addition to the view in FIG. 6. Herein, the first coupling element KE1 by way of which the deployment rod AS is guided in the stationary fixed slotted link KO can be seen. Furthermore, the deployment rod AS on a lower side has a further coupling element KE3. The further coupling element KE3 for locking the deployment rod AS in the Y direction is guided in the locking slotted link KV. In that state of the arrangement that is shown in FIG. 7, the further coupling element KE3 of the deployment rod AS is not engaged with the locking slotted link KV. The deployment rod AS herein is not yet decoupled from the sliding member S and is entrained by the latter in the X direction.

Figure 8:
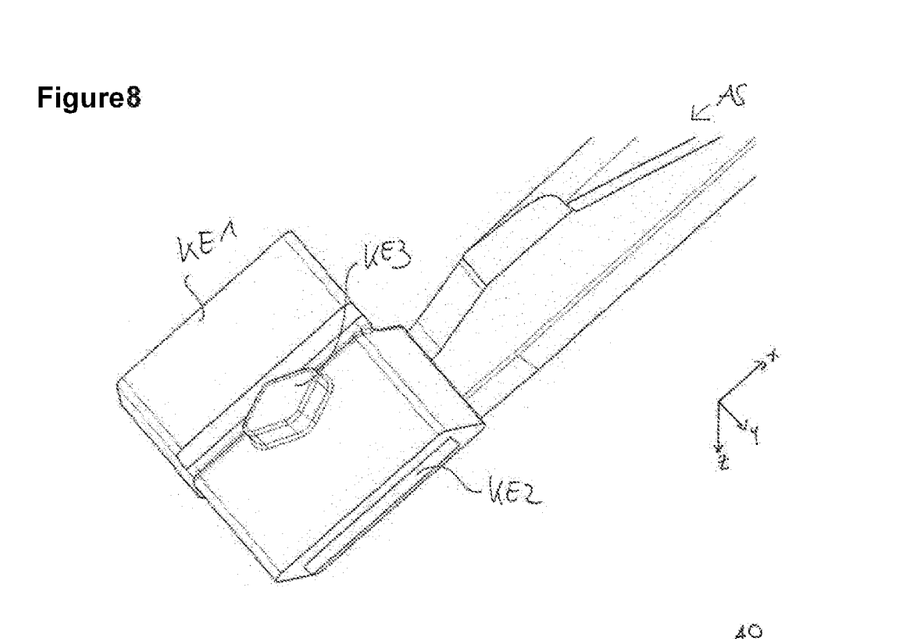
FIG. 8 shows a perspective view of a deployment rod from a lower side.

The further coupling element KE3 is once again clearly illustrated in FIG. 8, wherein the deployment rod AS is shown in perspective from a lower side.

Figure 9:
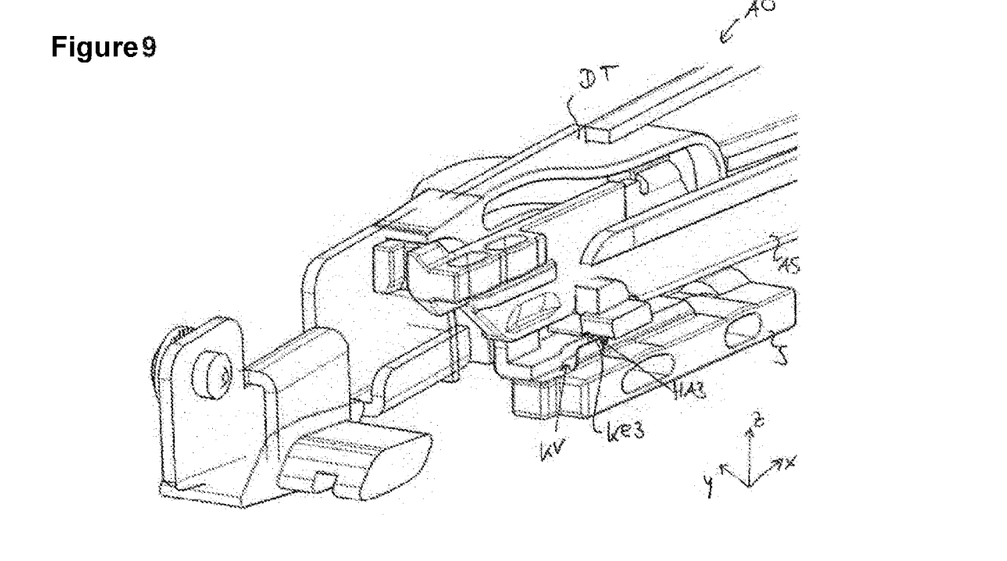
FIGS. 9 to 11 show perspective views of the arrangement in the front region of the deployment rod in the venting position.

If and when the sliding member S, starting from the state shown in FIG. 7, is displaced, the deployment rod AS decouples from the sliding member S, as has been described by means of FIGS. 3A to 5B, wherein the second coupling element KE2 is guided into the front portion VA2 of the sliding member slotted link KS. Herein, the deployment rod AS is urged downward in the vertical direction, as has been described. The further coupling element KE3 of the deployment rod AS herein plunges into the locking slotted link KV, as can be seen in FIG. 9. The further coupling element KE3 is henceforth located in the rear portion HA3 of the locking slotted link KV.

Figure 10:
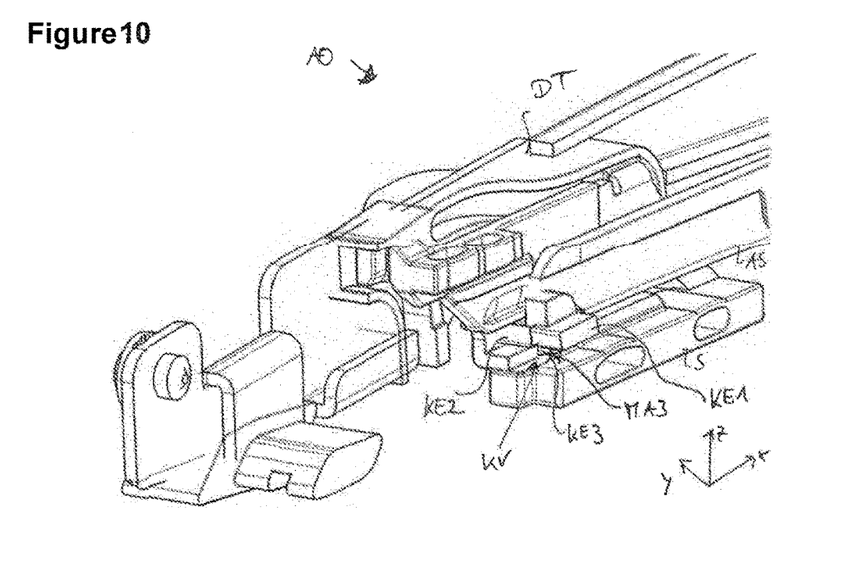
Figure 11:
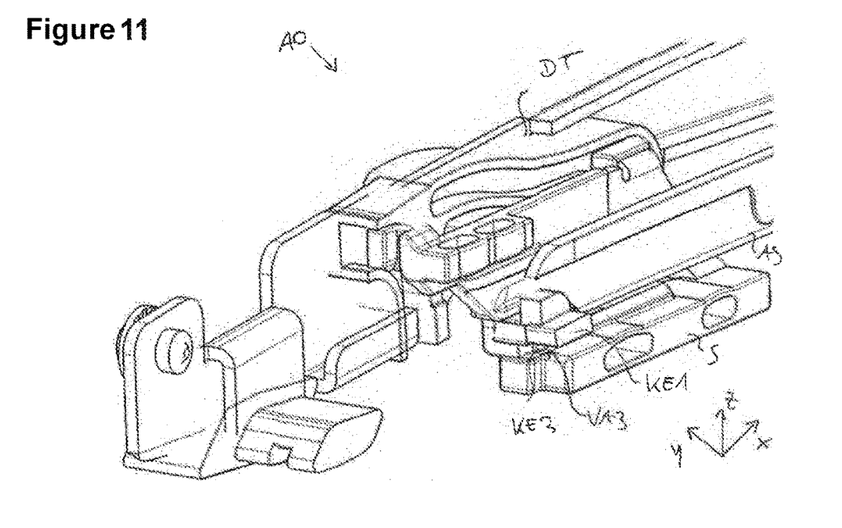
Figure 12:
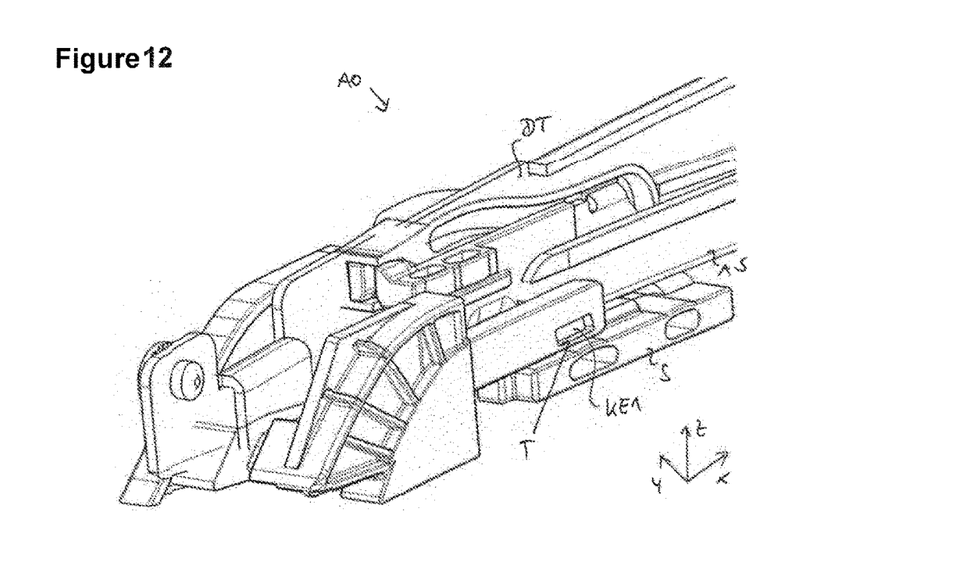
FIG. 12 shows a perspective view of the arrangement prior to locking the deployment rod in a pocket.
Figure 13:
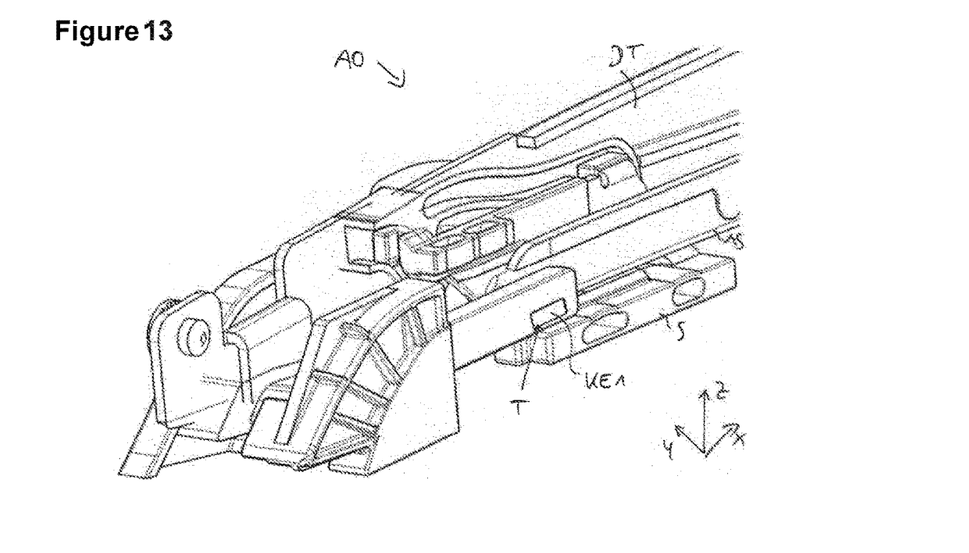
FIG. 13 shows a perspective illustration of the arrangement post-locking the deployment rod in the pocket.

If and when the sliding member S is displaced farther in the longitudinal direction of the vehicle toward the rear, the further coupling element KE3 of the deployment rod AS is guided into the front portion VA3 of the locking slotted link KV. During this movement, the deployment rod AS is displaced in the Y direction. This is illustrated in FIGS. 10 and 11. Herein, by virtue of the X locking by means of the first coupling element KE1, the deployment rod AS in the stationary fixed slotted link KO is positionally fixed in relation to the guide rail FS. It is thus controlled by means of the locking slotted link KV that the first coupling element KE1 executes a movement in the Y direction. Herein, the first coupling element KE1 plunges into a pocket T which is stationary fixed in relation to the guide rail FS, as is shown in FIGS. 12 and 13. The pocket T herein in terms of the shaping thereof is adapted to the first coupling element KE1. In other words, an external contour of the first coupling element KE1 is adapted to an internal contour of the pocket T. The pocket T thus corresponds to a negative mold of the first coupling element KE1.

By introducing the first coupling element KE1 into the pocket T, the deployment rod AS is locked in all directions in parallel with the decoupling plane AE. In particular, the deployment rod AS is locked in the Z direction and in the X direction. It is thus not possible for the deployment rod AS to be readily moved from the locked position thereof.

The deployment rod AS may optionally also be biased. To this end, the deployment rod AS is slightly bent in relation to the longitudinal direction of the vehicle, that is to say in the X direction in the X-Y plane in the exemplary embodiment. Upon assembly, the deployment rod AS is assembled and inserted so as to be bent straight, as is shown in FIGS. 2 to 13. By virtue of the bias, the deployment rod AS attempts to bend back to the original bent shape thereof such that a spring force acts in particular in the Y direction. The spring force thus acts in the direction of the pocket T. This has the advantage that, following the further coupling element KE3 being introduced into the pocket T, the further coupling element KE3 is held in the pocket T by virtue of the spring force by way of the bias of the deployment rod AS. This guarantees particularly reliable guiding and locking of the deployment rod AS.

If and when the sliding member S is again pushed back counter to the longitudinal direction of the vehicle, the further coupling element KE3 is first guided out of the pocket T, and the sequence of motion that has been described by means of FIGS. 3A to 5B is then run through in the reversed order.

The deployment rod AS in the exemplary embodiment is guided in the stationary fixed slotted link KO by way of the first coupling element KE1, and is subsequently locked in the pocket T by way of the first coupling element KE1. Alternatively, a further coupling element which instead of the first coupling element KE1 is locked in the pocket T may also be provided. Alternatively to the exemplary embodiment, the deployment rod AS may also decouple from the sliding member S in another decoupling plane. Such a decoupling plane could be defined by the X and the Y direction, for example. For locking, the pocket accordingly has to be disposed in such a manner that the respective coupling element may be guided into the pocket in the Z direction, that is to say in a normal manner to the decoupling plane.

Figure 14:
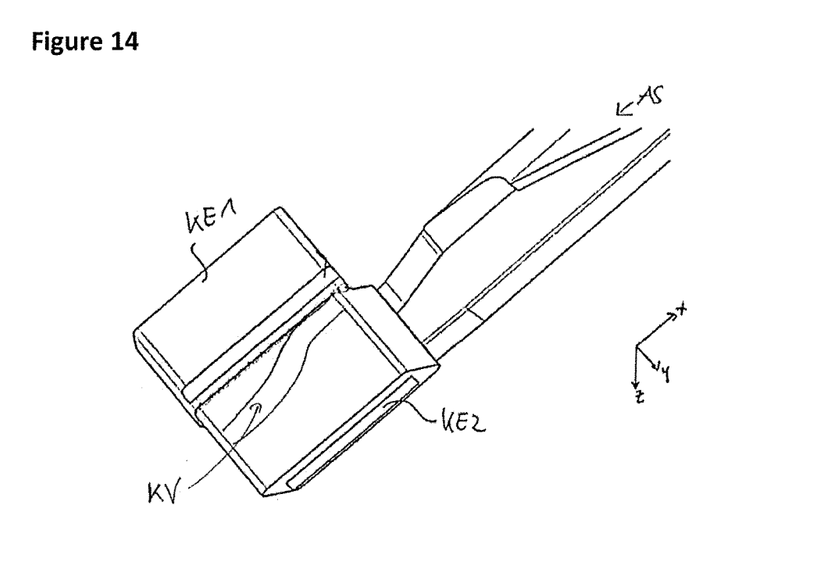
FIG. 14 shows a perspective view of a deployment rod from a lower side.
Figure 15:
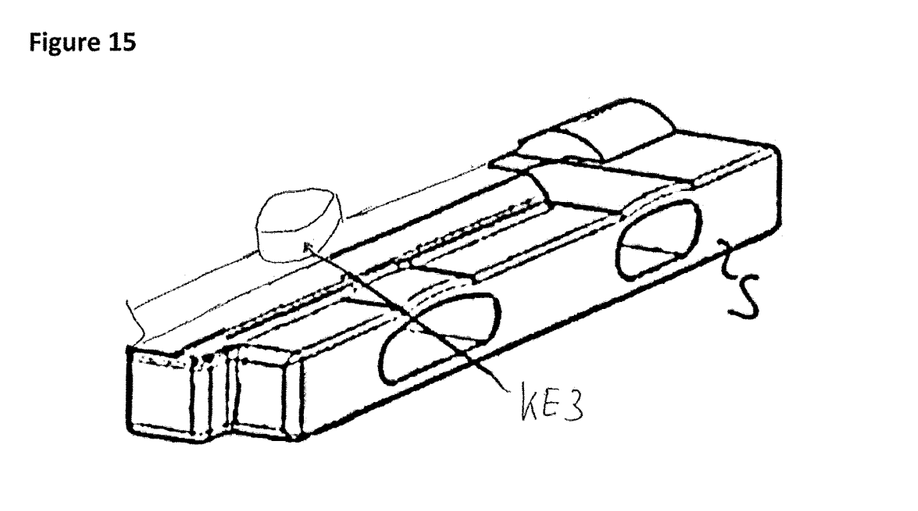
FIG. 15 shows a perspective view of a sliding member.

Alternatively, as illustrated in FIGS. 14 and 15, the deployment rod AS has the locking slotted link KV, and the sliding member S has the further coupling element KE3.

All parts and elements illustrated in terms of the explicit shaping thereof may be modified and/or varied, wherein the fundamental mechanical and kinematic principle of action of the arrangement AO as explained herein is to be maintained.

The invention claimed is:

1. An arrangement having a cover for a vehicle roof which, starting from a closed position for closing a roof opening, is raisable for opening using deployment means in the rear region thereof and which is displaceable toward the rear over the vehicle roof into an open position, wherein the deployment means have
    a sliding member which is displaceable in the longitudinal direction of the vehicle in a guide rail by means of a drive;
    a deployment rod, having a first coupling element and a second coupling element, the deployment rod being displaceable in the longitudinal direction of the vehicle by means of the sliding member, wherein the deployment rod in the closed position of the cover is coupled to the sliding member by the second coupling element;
    a pocket which in relation to the guide rail is configured so as to be stationary fixed and which in terms of the shaping thereof is adapted to the first coupling element of the deployment rod; and
    a further coupling element and a locking slotted link, of which the deployment rod has the one, and the sliding member has the respective other;
    such that
    starting from the closed position of the cover, upon displacing the sliding member in the longitudinal direction of the vehicle toward the rear, the deployment rod is decouplable from the sliding member in a decoupling plane and in relation to the guide rail is locked in a form-fitting manner, wherein for locking, the further coupling element and the locking slotted link are mutually engaged in such a manner that inserting the first coupling element of the deployment rod into the pocket is controllable substantially in the normal direction of the decoupling plane.

2. The arrangement according to claim 1, wherein the sliding member has the locking slotted link, and the deployment rod has the further coupling element.

3. The arrangement according to claim 1, wherein the sliding member has the further coupling element, and the deployment rod has the locking slotted link.

4. The arrangement according to claim 1, wherein the deployment rod is biased in such a manner that a spring force in the normal direction of the decoupling plane acts in the direction of the pocket.

5. The arrangement according to claim 1, wherein a profile of the locking slotted link in the longitudinal direction of the vehicle toward the rear has a front portion in which a spacing in the normal direction between the locking slotted link and the pocket remains the same, a central portion in which the spacing in the normal direction between the locking slotted link and the pocket is varied, and a rear portion in which the spacing in the normal direction between the locking slotted link and the pocket remains the same.

6. The arrangement according to claim 5, wherein the spacing in the central portion is increased in the longitudinal direction of the vehicle toward the rear.

7. The arrangement according to claim 1, wherein the decoupling plane is defined by the longitudinal direction of the vehicle and by a vertical direction which is perpendicular thereto.

8. The arrangement according to claim 1, wherein the first and second coupling elements are configured as sliding elements.

\* \* \* \* \*

UNITED STATES PATENT AND TRADEMARK OFFICE
CERTIFICATE OF CORRECTION

PATENT NO. : 10,106,020 B2
APPLICATION NO. : 15/309783
DATED : October 23, 2018
INVENTOR(S) : Dominik Hölzel Page 1 of 1

It is certified that error appears in the above-identified patent and that said Letters Patent is hereby corrected as shown below:

On the Title Page

Item (12) please delete the first inventor's last name and insert -- Hölzel -- therefore.

Item (72) please delete the first inventor's name and insert -- Dominik Hölzel -- therefore.

Signed and Sealed this
Nineteenth Day of March, 2019

Andrei Iancu
*Director of the United States Patent and Trademark Office*